(12) United States Patent
Saeda

(10) Patent No.: US 10,547,760 B2
(45) Date of Patent: Jan. 28, 2020

(54) IMAGE FORMING APPARATUS PERFORMING WIRELESS COMMUNICATION AND METHOD OF SETTING AND STARTING A JOB VIA WIRELESS COMMUNICATION

(71) Applicant: Sharp Kabushiki Kaisha, Sakai, Osaka (JP)

(72) Inventor: Masao Saeda, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/257,712

(22) Filed: Jan. 25, 2019

(65) Prior Publication Data

US 2019/0158693 A1    May 23, 2019

Related U.S. Application Data

(63) Continuation of application No. 15/828,989, filed on Dec. 1, 2017, now Pat. No. 10,230,864, which is a
(Continued)

(30) Foreign Application Priority Data

Oct. 11, 2013    (JP) .................................. 2013-213767

(51) Int. Cl.
*G06F 15/00* (2006.01)
*G06F 3/12* (2006.01)
(Continued)

(52) U.S. Cl.
CPC ....... *H04N 1/00973* (2013.01); *G06F 3/1205* (2013.01); *G06F 3/126* (2013.01);
(Continued)

(58) Field of Classification Search
CPC ........... H04N 1/00973; H04N 1/00103; H04N 1/00464; H04N 1/00493; H04N 1/32507;
(Continued)

(56) References Cited

U.S. PATENT DOCUMENTS 8,687,214 B2    4/2014 Kurahashi
8,689,002 B2    4/2014 Yamamoto
(Continued)

FOREIGN PATENT DOCUMENTS

| CN | 1784651 A | 6/2006 |
|---|---|---|
| CN | 103312926 A | 9/2013 |

(Continued)

*Primary Examiner* — Douglas Q Tran
(74) *Attorney, Agent, or Firm* — Birch, Stewart, Kolasch & Birch, LLP

(57) ABSTRACT

An image forming apparatus comprising: a wireless communication circuitry configured to make a wireless communication with a portable information processing device including: a display unit for displaying a simplified job setting screen on the portable information processing device side; and an operation unit for displaying a full job setting screen on the image forming apparatus side; and a computer and a memory storing a program causing the computer to execute: a recognition step recognizing a portable information processing device that is within a communicable range through communication via the wireless communication circuitry; a job setting step receiving a job setting; and a job control step receiving a start instruction and executing the job in response to the start instruction, wherein the job setting step receives the job setting, which is made by use of the simplified job setting screen, from the portable information processing device, via the wireless communication circuitry after the portable information processing device falls within the communicable range or receives the job setting, which is made by use of the full job setting screen, from the operation unit; and the full job setting screen
(Continued)

provides not only corresponding set items but also additional information on the item to the simplified job setting screen.

4 Claims, 11 Drawing Sheets

Related U.S. Application Data continuation of application No. 15/450,412, filed on Mar. 6, 2017, now Pat. No. 9,866,717, which is a continuation of application No. 15/056,651, filed on Feb. 29, 2016, now Pat. No. 9,626,130, which is a continuation of application No. 14/867,904, filed on Sep. 28, 2015, now Pat. No. 9,304,725, which is a continuation of application No. 14/511,310, filed on Oct. 10, 2014, now Pat. No. 9,176,689.

(51) Int. Cl.
*G06K 1/00* (2006.01)
*H04N 1/00* (2006.01)
*H04N 1/32* (2006.01)
*H04N 1/327* (2006.01)

(52) U.S. Cl.
CPC ......... *G06F 3/1212* (2013.01); *G06F 3/1253* (2013.01); *G06F 3/1292* (2013.01); *H04N 1/00103* (2013.01); *H04N 1/00464* (2013.01); *H04N 1/00493* (2013.01); *H04N 1/32507* (2013.01); *H04N 1/32765* (2013.01); *H04N 2201/006* (2013.01); *H04N 2201/0094* (2013.01)

(58) Field of Classification Search
CPC ......... H04N 1/32765; H04N 2201/006; H04N 2201/0094; G06F 3/1205; G06F 3/1212; G06F 3/1253; G06F 3/126; G06F 3/1292

USPC .............................. 358/1.15, 1.14, 1.13, 1.1
See application file for complete search history.

(56) References Cited

U.S. PATENT DOCUMENTS

| | | |
|---|---|---|
| 8,823,963 B2 | 9/2014 | Imaizumi et al. |
| 9,047,541 B2 | 6/2015 | Kavanapillil et al. |
| 9,229,666 B2 * | 1/2016 | Oguma ................ G06F 3/1231 |
| 9,304,725 B2 | 4/2016 | Saeda |
| 9,626,130 B2 | 4/2017 | Saeda |
| 2006/0115309 A1 | 6/2006 | Matsunaga |
| 2010/0123927 A1 | 5/2010 | Hirose |
| 2010/0202014 A1 | 8/2010 | Matsuyama |
| 2012/0182432 A1 | 7/2012 | Okamoto et al. |
| 2013/0013946 A1 | 1/2013 | Hamada |
| 2013/0229687 A1 | 9/2013 | Yamauchi |
| 2014/0153039 A1 | 6/2014 | Sasase |
| 2015/0103376 A1 | 4/2015 | Saeda |
| 2015/0109631 A1 * | 4/2015 | Hayano .............. H04N 1/00307 |
| | | 358/1.13 |

FOREIGN PATENT DOCUMENTS

| | | |
|---|---|---|
| JP | 2008-219351 A | 9/2006 |
| JP | 2007-318519 A | 12/2007 |
| JP | 2008-200898 A | 9/2008 |
| JP | 2011-155495 A | 8/2011 |
| JP | 2012-37986 A | 2/2012 |
| JP | 2012-147387 A | 8/2012 |
| JP | 2012-238178 A | 12/2012 |
| JP | 2013-015719 A | 1/2013 |
| JP | 2013-131062 A | 7/2013 |
| JP | 2013-171421 A | 9/2013 |
| JP | 2015-076842 A | 4/2015 |

* cited by examiner

IMAGE FORMING APPARATUS PERFORMING WIRELESS COMMUNICATION AND METHOD OF SETTING AND STARTING A JOB VIA WIRELESS COMMUNICATION

CROSS-REFERENCE TO RELATED APPLICATION

This application is a Continuation of co-pending U.S. application Ser. No. 15/828,989 filed Dec. 1, 2017, which was a continuation of U.S. application Ser. No. 15/450,412, filed on Mar. 6, 2017 (now U.S. Pat. No. 9,866,717 issued on Jan. 9, 2018), which was a continuation of U.S. application Ser. No. 15/056,651 filed on Feb. 29, 2016 (now U.S. Pat. No. 9,626,130 issued on Apr. 18, 2017), which was a continuation of U.S. application Ser. No. 14/867,904, filed on Sep. 28, 2015 (now U.S. Pat. No. 9,304,725 issued on Apr. 5, 2016), which was a continuation of U.S. application Ser. No. 14/511,310, filed on Oct. 10, 2014 (now U.S. Pat. No. 9,176,689 issued on Nov. 3, 2015), and claims priority under 35 U.S.C. § 119(a) to Application No. 2013-213767, filed in Japan on Oct. 11, 2013, all of which are hereby expressly incorporated by reference into the present application.

BACKGROUND OF THE INVENTION

Field of the Invention

The present invention relates to an image forming apparatus that performs a short-range wireless communication with a portable information processing device.

Description of the Background Art

Recently, a device using a technique of a short-range wireless communication for personal authentication has been in widespread use. Specific examples of this type of device include a company ID card using a non-contact IC card and Osaifu keitai (registered trademark) (mobile payment service). The short-range wireless communication means a wireless communication with a short communicable range in a broad sense, but it means a near field communication (sometimes abbreviated to NFC) in a narrow sense. In the NFC, a communicable range (this range is sometimes referred to as a "field" below) is about 1 meter to a few centimeters. The NFC has standards such as FeliCa (registered trademark) and MIFARE (registered trademark). The short-range wireless communication in a broad meaning includes standards such as Wi-Fi (registered trademark) and Bluetooth (registered trademark) in addition to NFC. In this specification, the term of the short-range wireless communication is used as a broad meaning including Wi-Fi and Bluetooth.

Recently, a lot of portable information processing devices, such as smartphones, tablet computers, or mobile computers, have a function of a short-range wireless communication. In addition, processing power of the portable information processing devices has been enhanced.

Under such a circumstance, Japanese Unexamined Patent Publication No. 2011-155495, for example, describes a device that performs a user authentication based on authentication information for each user upon giving permission to use an image forming apparatus such as a digital multifunction peripheral, wherein the authentication information is retained by a device having a short-range wireless communication function.

Japanese Unexamined Patent Publication No. 2012-238178, for example, describes a system in which a short-range wireless communication is executed between an image forming apparatus receiving a print instruction and other image forming apparatus located at a short distance from the image forming apparatus, and both image forming apparatuses perform a printing operation.

Although processing power of portable information processing devices has been enhanced, the processing power cannot sufficiently be utilized for an operation setting of an image processing apparatus.

For example, a digital multifunction peripheral placed in a public space such as a convenience store is used by unspecified number of users. In such a case, if this digital multifunction peripheral is currently making an operation (job) such as a copying operation or printing operation, the other user has to wait until this job is completed in principle. Specifically, while a first user makes a setting of his/her copying job by using an operation panel of the digital multifunction peripheral, a second user cannot make a setting for his/her copying job. When the digital multifunction peripheral already starts the copying job or the printing job for the first user, the second user cannot obtain his/her copy output until the output for the first user is completed, even if the second user can make a setting for his/her copying job on the operation panel.

SUMMARY OF THE INVENTION

The present invention is accomplished in view of the above circumstance, and aims to provide an image forming apparatus that enables an interactive operation using an external portable information processing device with a short-range wireless communication.

The present invention provides an image forming apparatus comprising: a wireless communication circuitry configured to make a wireless communication with a portable information processing device including: a display unit for displaying a simplified job setting screen on the portable information processing device side; and an operation unit for displaying a full job setting screen on the image forming apparatus side; and a computer and a memory storing a program causing the computer to execute: a recognition step recognizing a portable information processing device that is within a communicable range through communication via the wireless communication circuitry; a job setting step receiving a job setting; and a job control step receiving a start instruction and executing the job in response to the start instruction, wherein the job setting step receives the job setting, which is made by use of the simplified job setting screen, from the portable information processing device, via the wireless communication circuitry after the portable information processing device falls within the communicable range or receives the job setting, which is made by use of the full job setting screen, from the operation unit; and the full job setting screen provides not only corresponding set items but also additional information on the item to the simplified job setting screen.

In the present invention, job setting step receiving a job setting; and a job control step receiving a start instruction and executing the job in response to the start instruction. Therefore, not only the user authentication but also the operation for the job setting are possible by using the portable information processing device that can make communication through a short-range wireless communication. Accordingly, the job setting can efficiently be made, even if plural users simultaneously use the image forming apparatus.

Supposing a scene in which a digital multifunction peripheral placed in a public space such as a convenience store is used by plural users, for example. It is also supposed that a portable information processing device carried by each user, such as a smartphone, a tablet computer, or a mobile computer, can make user authentication and payment using a function of Osaifu keitai (mobile payment service). In other words, the portable information processing device carried by each user can communicate with the digital multifunction peripheral through the short-range wireless communication such as NFC, Wi-Fi, or Bluetooth.

According to an exemplary embodiment of the present invention, a job setting screen is displayed on a display unit of the portable information processing device. Each user preliminarily performs a job setting on the job setting screen of the portable information processing device. After the job executed by the digital multifunction peripheral is completed, the user allows the portable information processing device to touch the digital multifunction peripheral to make communication through the NFC, for example. Alternatively, the user makes communication with the digital multifunction peripheral through a short-range wireless communication with other system. Thus, the user can make the job setting for the digital multifunction peripheral, as well as the user authentication and payment with the function of Osaifu keitai, by using the portable information processing device.

Each user can smoothly make an operation by using the portable information processing device, and further, does not have to wait until the other user finishes a job setting by using the operation panel of the digital multifunction peripheral. Since the time when the user occupies the digital multifunction peripheral only for the operation setting can be reduced, the store having the digital multifunction peripheral can increase utilization rate of the digital multifunction peripheral.

DESCRIPTION OF THE PREFERRED EMBODIMENTS

The preferred embodiment of the present invention will be described in more detail with reference to the drawings. The description below is presented by way of example only, and is not intended to limit the scope of the present invention.

<<Communication System of Digital Multifunction Peripheral>>

A digital multifunction peripheral is considered as an exemplary embodiment of the image forming apparatus according to the present invention. One example of a system in which this digital multifunction peripheral communicates with an external device will be described.

Figure 1:
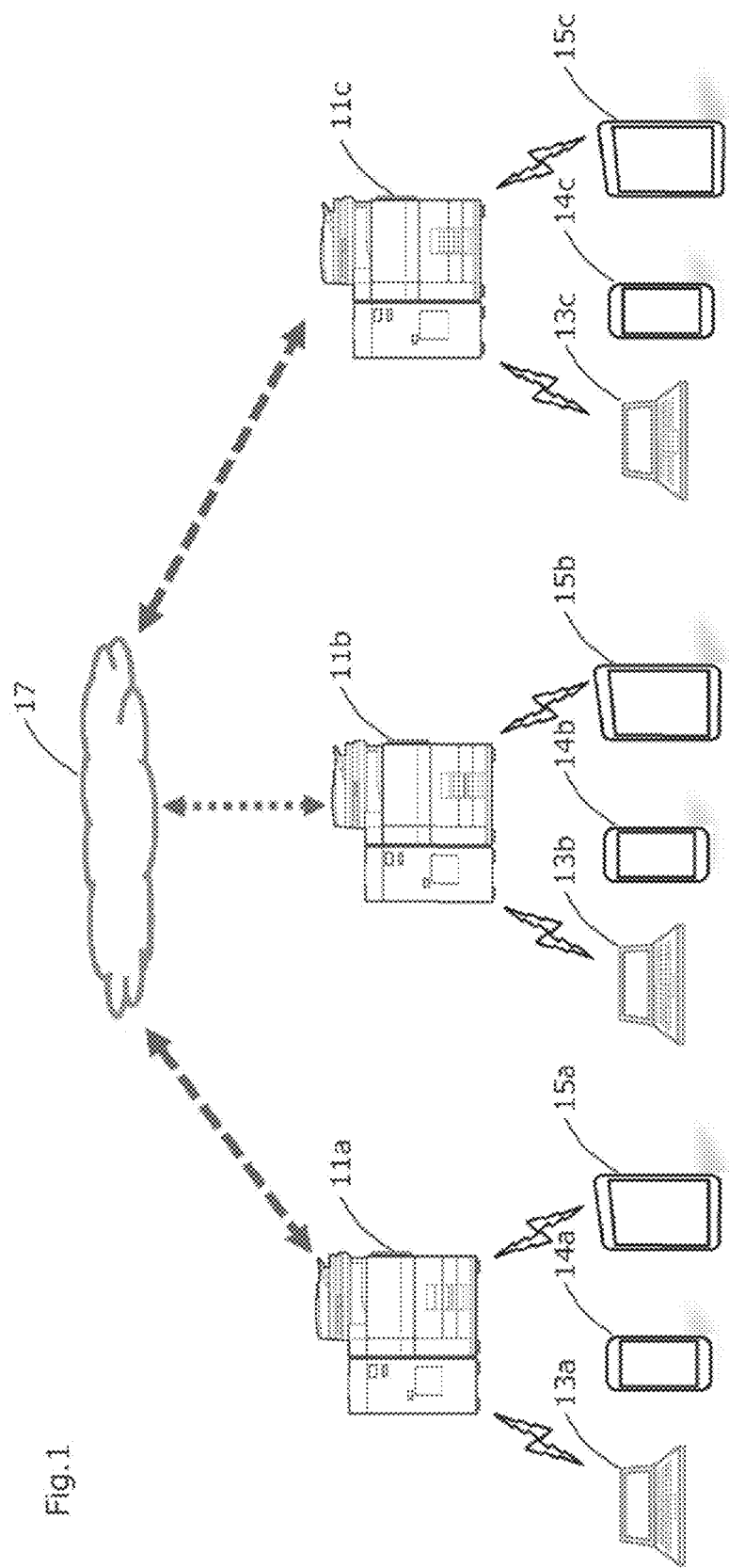
FIG. 1 is an explanatory view illustrating one example of a system in which an image forming apparatus according to an embodiment of the present invention communicates with an external device.

FIG. 1 is an explanatory view illustrating one example of a system in which the digital multifunction peripheral communicates with an external device. In FIG. 1, digital multifunction peripherals 11a, 11b, and 11c are the image forming apparatuses according to the present embodiment. For example, the digital multifunction peripheral 11a is placed in a store A that is a convenience store. The digital multifunction peripheral 11b is placed in a convenience store (store B) different from the store A. The digital multifunction peripheral 11c is placed in a campus of a school. The digital multifunction peripherals that are placed in a public space to be used by general public as described above are typical examples of the image forming apparatus. However, the present embodiment is not limited to the image forming apparatus placed in a public space. The present embodiment is applicable to an image forming apparatus placed on a floor of an office. Basically, the present the embodiment is applicable to an image forming apparatus having a short-range wireless communication function.

For example, the digital multifunction peripheral 11a sends and receives information with a mobile computer 13a of a certain user through a short-range wireless communication (e.g., wireless LAN communication based on Wi-Fi standard). The digital multifunction peripheral 11a also sends and receives information with a smartphone 14a of another user through a short-range wireless communication (e.g., near field communication based on NFC standard). The digital multifunction peripheral 11a also sends and receives information with a tablet computer 15a of another user through a short-range wireless communication (e.g., wireless communication based on Bluetooth standard). Similarly, the digital multifunction peripheral 11b communicates with a mobile computer 13b, a smartphone 14b, or a tablet computer 15b through a short-range wireless communication. The digital multifunction peripheral 11c also communicates with a mobile computer 13c, a smartphone 14c, or a tablet computer 15c through a short-range wireless communication.

The digital multifunction peripherals 11a, 11b, and 11c are connected to an external cloud server 17 through a far field communication network (e.g., the Internet) different from the short-range wireless communication. The digital multifunction peripherals 11a, 11b, and 11c transmit status information, indicating a status of each peripheral, to the cloud server 17. The status information indicates a status of each of the digital multifunction peripherals 11a, 11b, and 11c, and it is information indicating whether each of the digital multifunction peripherals 11a, 11b, and 11c is in a normal operation status or not. The status information also includes a type of a job (copy, fax, photo service, printing service, scan service, etc.) that is currently in progress, waiting to be executed, or waiting for a start instruction, and which status each job is in (job status), in other words, whether each job is currently in progress, waiting to be executed, or waiting for a start instruction. The status information may include a time when each job is in the status of being in progress, in the status of waiting to be executed, or in the status of waiting for a start instruction, and the detail (e.g., set number of copies, set number of prints, whether a post-process is done or not, a type of a post-process, 1-sided/2-sided, or detail of special function) of the job setting. The special function includes a function of adding margins, a function of erasing peripheral shadows, a function of copying each facing page of a bound document, and other functions.

The cloud server 17 is connected to the plural image forming apparatuses through a network, thereby being capable of recognizing the status of each image forming apparatus. The cloud server 17 stores a set-up place as well as status information of each image forming apparatus. A worker who sets up each image forming apparatus accesses to the cloud server 17 to register the set-up place.

<<Configuration of Image Forming Apparatus>>

The schematic configuration of the image forming apparatus according to the present embodiment will be described. The description corresponds to the digital multifunction peripherals 11a, 11b, and 11c in FIG. 1.

Figure 2:
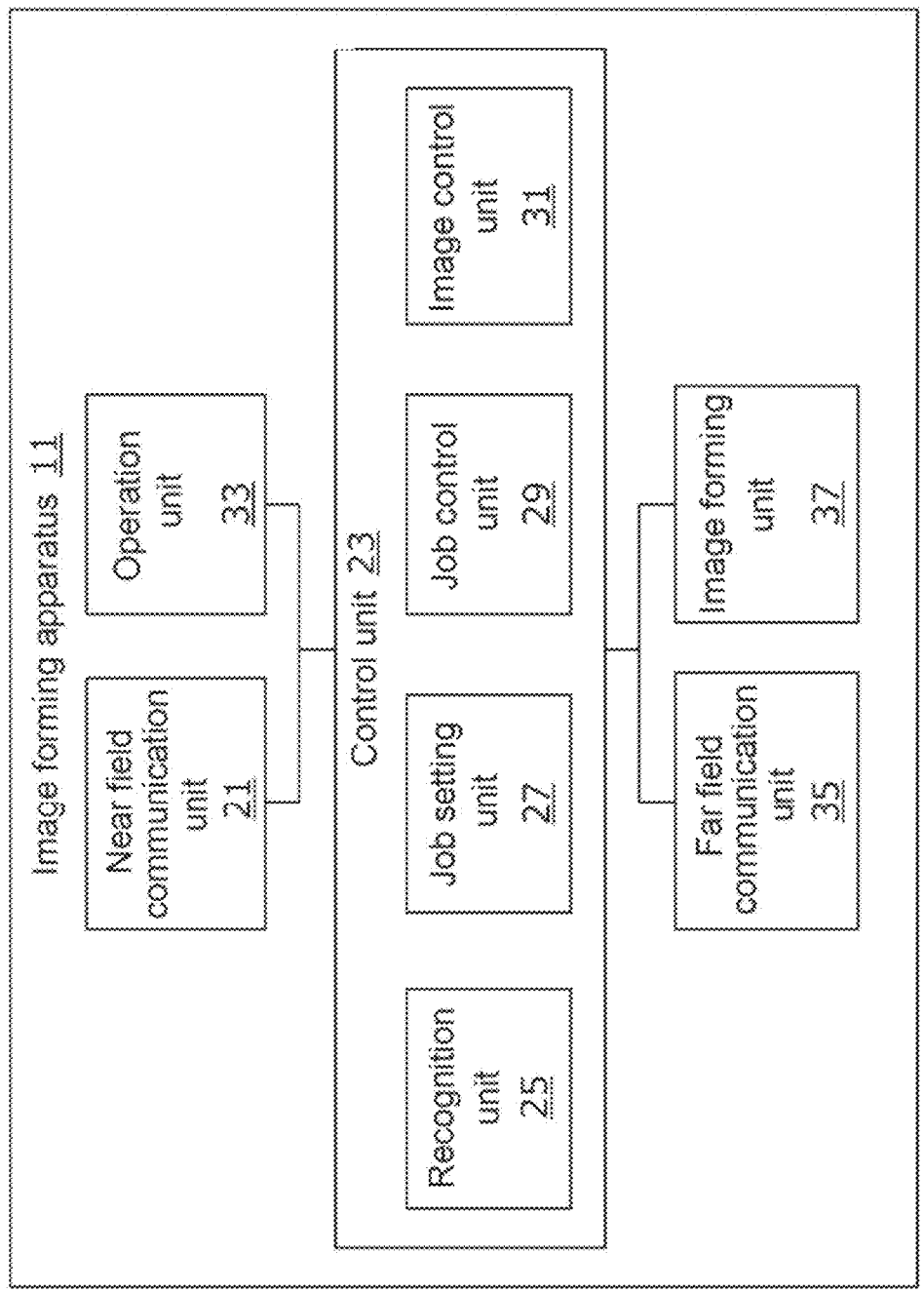
FIG. 2 is a block diagram illustrating a configuration of a digital multifunction peripheral according to the embodiment of the present invention.

FIG. 2 is a block diagram illustrating the configuration of the image forming apparatus, which is the digital multifunction peripheral, according to the present embodiment. The digital multifunction peripheral 11 illustrated in FIG. 2 corresponds to the digital multifunction peripherals 11a, 11b, and 11c illustrated in FIG. 1. They have the similar configuration.

In FIG. 2, a near field communication unit 21 performs a short-range wireless communication with the external portable information processing device. Specific examples of the short-range wireless communication include NFC, Wi-Fi, Bluetooth, etc. However, the short-range wireless communication is not limited thereto. The near field communication unit 21 may have any one of these communication functions, or may be adapted to plural communications. The near field communication unit 21 may receive print data from the portable information processing device in a printing service.

The control unit 23 is mainly composed of a computer as a specific hardware configuration, and also includes a memory, an input/output circuit, and other peripheral circuits. The computer in the control unit 23 executes a control program, stored beforehand in the memory, to control the digital multifunction peripheral 11. As representative functions of the control unit 23, a recognition unit 25, a job setting unit 27, a job control unit 29, and an image control unit 31 are described. However, the control unit 23 executes various processes not belonging to these functions.

When the portable information processing device falls within a field where the communication by the near field communication unit 21 is possible, the recognition unit 25 recognizes the presence of this portable information processing device, and tries to establish communication. For example, when a portable information processing device having a Bluetooth communication function falls within the field, the recognition unit 25 makes a paring process with the digital multifunction peripheral 11.

This is the case where the short-range wireless communication is the Bluetooth. However, when a portable information processing device having wireless LAN communication complying with Wi-Fi standard falls within the field, the recognition unit 25 tries to establish communication.

The job setting unit 27 transmits data for displaying a job setting screen in response to a request from the portable information processing device to which the communication is established. The job setting unit 27 then receives a job setting made by an operation with the job setting screen.

The request is issued in response to a start of an application that is preliminarily installed into the portable information processing device by a user for setting a job. Alternatively, the digital multifunction peripheral 11 provides a Web site for setting a job, and after the user finishes a login to the Web site by using the portable information processing device to which the communication is established, the request is issued.

In the case where the short-range wireless communication is the NFC, the recognition unit 25 establishes communication when the user touches the portable information processing device on a predetermined region (e.g., some region on the operation panel) of the digital multifunction peripheral 11. Simultaneously, the recognition unit 25 transmits data for displaying the job setting screen to this portable information processing device. The recognition unit 25 displays the job setting screen simultaneous with the touch, since the touch action is considered to indicate the user's intention of using the portable information processing device for the operation of the digital multifunction peripheral 11.

The job setting unit 27 receives the job setting made by using the operation unit 33 of the digital multifunction peripheral 11.

The job setting unit 27 stores the received job setting for each of the portable information processing devices transmitting each job. The job setting unit 27 stores the job setting by the operation unit 33, separate from the received job settings.

The job control unit 29 waits for the job start instruction for each of the job settings received by the job setting unit 27. When receiving the start instruction, the job control unit 29 starts the execution of this job. When a hardware resource cannot be used, such as the case where a job now in progress is present, the job control unit 29 registers this job to a job queue. The job registered to the job queue is sequentially executed based on first-in first-out principle. The job setting can be changed by the user's operation. For example, the job in the job queue can be deleted, or the order of the jobs in the job queue can be rearranged. The user can perform these operations by using the operation unit 33, or the job setting unit 27 can make these operations by using the portable information processing device that receives the corresponding job.

The job control unit 29 may delete the job, when it is in the status of waiting for a start instruction, or when the portable information processing device that receives the job setting of the job registered to the job queue is outside the near field where the communication is possible, before the execution of the job. Alternatively, the job control unit 29 may suspend the job until a predetermined period has elapsed. When the portable information processing device is returned to the near field where the communication is possible before the lapse of the predetermined period, the job control unit 29 may continue this job, and when it is not returned, the job control unit 29 may delete this job.

There are jobs that can be simultaneously executed without a competition of hardware resources, depending upon the configuration of the digital multifunction peripheral 11 and the type of the job. For example, a fax transmission and a printing service may simultaneously be executed. A scanning service and a printing service may also simultaneously be executed. The job control unit 29 manages the job queue, considering these conditions.

The image control unit 31 controls the image forming process for each job. The operation unit 33 displays the status and the setting of the digital multifunction peripheral 11 to the user, and receives the user's operation. A liquid crystal display device with a touch panel is applied as hardware, for example. An operation key may also be provided in addition to the liquid crystal display device. The operation key includes, for example, a numerical keypad used for inputting a number of copies or phone number, and a start key receiving an instruction of starting a job.

A far field communication unit 35 receives and transmits data, such as the status information, with the cloud server 17 in FIG. 1. The far field communication unit 35 also receives print data from a host connected to the network during the printing service.

The image forming unit 37 performs an image formation relating to the job such as the copy, fax, photo service, printing service, and scan service. The image forming unit 37 is roughly composed of a hardware resource involved with reading of a document, a hardware resource involved with printing of a sheet, and a hardware resource involved with processing, reading, and writing of image data.

<<Operation of Digital Multifunction Peripheral with Portable Information Processing Device Using Short-Range Wireless Communication>>

Some modes in which the user of the digital multifunction peripheral according to the present embodiment operates and manages the digital multifunction peripheral by using the portable information processing device will be described next.

A job setting using the portable information processing device will be described as a first mode.

It is supposed that the digital multifunction peripheral 11*b* and the smartphone 14*b* in FIG. 1 have the NFC function, and they can communicate with each other.

When the digital multifunction peripheral 11*b* is in a stand-by mode, the liquid crystal display device on the operation unit 33 displays an initial screen, and the operation unit 33 receives a setting of a job and an instruction of starting the job.

Figure 3:
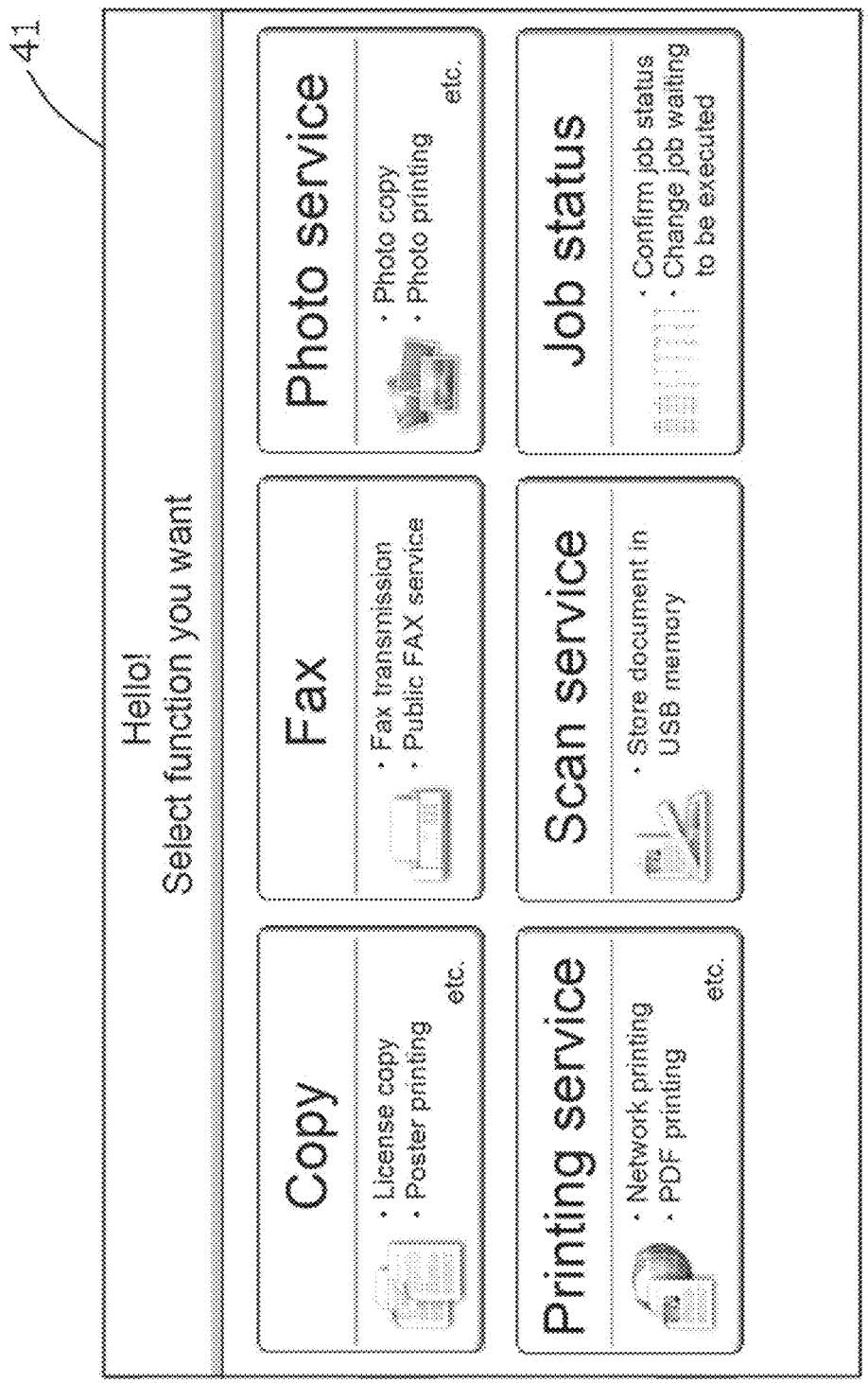
FIG. 3 is an explanatory view illustrating one example of a job setting screen displayed on an operation unit of a digital multifunction peripheral according to the embodiment of the present invention.

FIG. 3 is an explanatory view illustrating one example of a job setting screen 41 displayed on the operation unit 33 of the digital multifunction peripheral 11 according to the present embodiment. The job setting screen 41 illustrated in FIG. 3 includes operation buttons for selecting any one of the job settings of the copy, fax, photo service, printing service, and scan service, as a top menu. When each operation button is selected, the job setting unit 27 changes the job setting screen 41 to a screen by which a job setting for the job corresponding to the selected operation button is performed.

The job setting screen 41 in FIG. 3 includes the operation button for displaying a status screen. When this operation button is depressed, the job control unit 29 changes the job setting screen 41 to a status screen displaying the execution status of the job. The job control unit 29 receives the deletion or edition of the job that is waiting to be executed, on the status screen. The job control unit 29 also receives a search for other image forming apparatuses placed around the digital multifunction peripheral 11.

When the user touches the smartphone 14*b* on a predetermined region of the digital multifunction peripheral 11*b*, the recognition unit 25 recognizes that the smartphone 14*b* is within the field by the communication through the near field communication unit 21. In response to the situation in which the smartphone 14*b* is newly recognized, the job setting unit 27 transmits data for displaying the job setting screen on the display unit of the smartphone 14*b* through the near field communication unit 21. This data may request to start an application that is installed beforehand into the smartphone 14*b*, for example. Alternatively, this data may start a Web browser installed beforehand into the smartphone 14*b*, and may provide add-on. In this case, the job setting screen is displayed on the display unit as the add-on on the Web browser, and receives the user's operation.

<Copy Job Setting>

Figure 4:
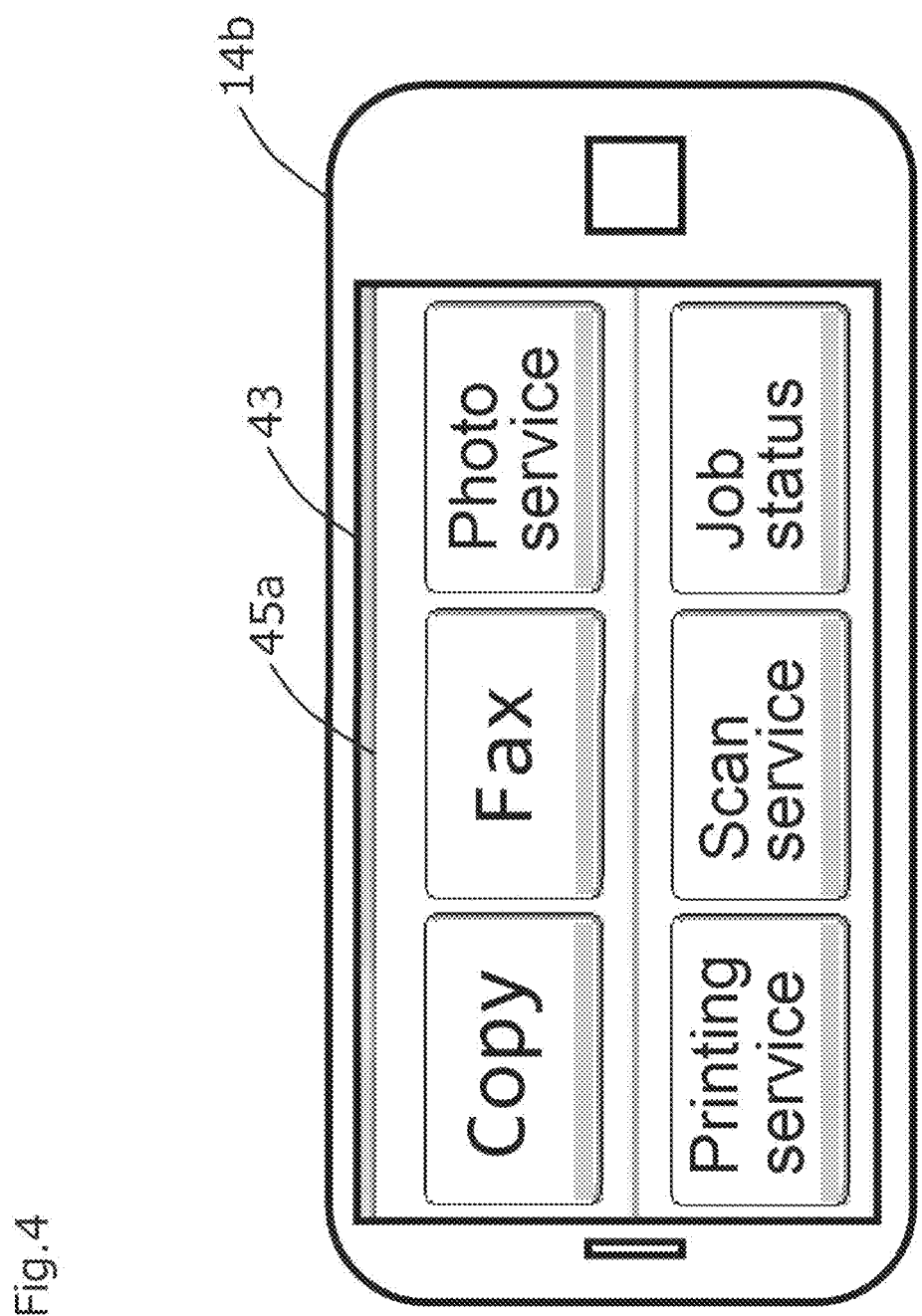
FIG. 4 is an explanatory view illustrating one example of a job setting screen displayed on a display unit of a portable information processing device according to the embodiment of the present invention.
Figure 5:
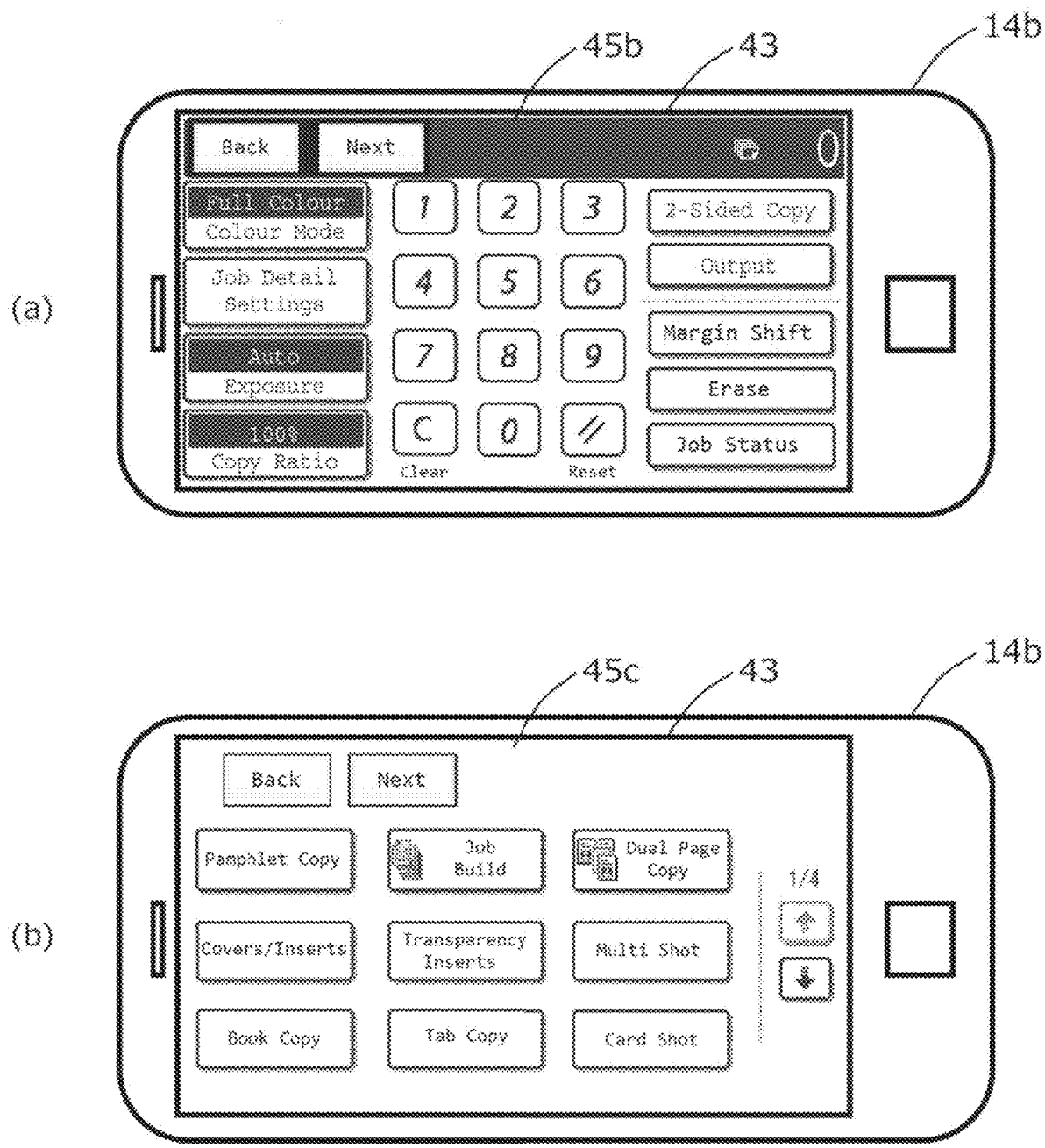
FIG. 5 is an explanatory view illustrating another example of a job setting screen displayed on the display unit of the portable information processing device according to the embodiment of the present invention.

FIGS. 4 and 5 are explanatory views illustrating one example of the job setting screen displayed on a display unit 43 of the smartphone 14*b* that is the portable information processing device according to the present embodiment. Operation buttons having the function same as that of the operation buttons in FIG. 3 are displayed on a job setting screen 45*a* illustrated in FIG. 4, although the design is different. Specifically, the operation buttons such as the copy, fax, photo service, printing service, and scan service, and the operation button for the status screen are displayed. When any one of the operation buttons of the copy, fax, photo service, printing service, and scan service is depressed, the depressing operation is received by the near field communication unit 21.

The job setting unit 27 changes the job setting screen 45*a* to a screen for performing a job setting for the corresponding job in response to the depressing operation.

FIG. 5 illustrates an example of a job setting screen for the copy job. Although the design is different, a job setting screen 45*b* illustrated in FIG. 5(*a*) can set items almost similar to the items set on the screen that receives the copy job setting on the operation unit 33. Specifically, the job setting screen 45*b* includes numerical keys used for setting a copy number, color mode, exposure, copy ratio, 2-sided copy, output, margin shift (a function of adding margins), erase (a function of erasing peripheral shadows), and job detail settings (for changing the screen to a setting screen for each of various details). A button for changing the job setting screen 45*b* to a status screen displaying the execution status of the job is arranged on a lower right corner.

FIG. 5(*b*) illustrates one example of a setting screen for various job details. This setting screen includes buttons for pamphlet copy (a function of copying each facing page of a bound document), job build, dual page copy, covers/inserts, transparency inserts, multi shot, book copy, tab copy, and card shot. When any one of these buttons is selected, the detail corresponding to the selected button is selected. When the selected job detail has the detail setting, the job setting screen 45*c* is changed to a screen for the detail setting.

When the user, who finishes the copy job setting on the job setting screens 45*b* and 45*c*, again touches the smartphone 14*b* on the digital multifunction peripheral 11*b*, the data of the job setting is transmitted to the digital multifunction peripheral 11b from the smartphone 14b by the communication through the near field communication unit 21. The job setting unit 27 receives the job setting, and stores the received job setting in the memory. In the case of the copy job, the job control unit waits for authentication for charge and the depression of a color start key or a B/W start key (both are not illustrated) arranged on the operation unit 33. In other words, the job control unit waits for the instruction of starting the copy job. An execution of a walk-up job, such as a copy job, a scan job, and a fax transmission job, is started when the color start key or the B/W start key is depressed. On the other hand, an execution of a print job is started when print data and data of job setting are received.

When either one of the color start key and the B/W start key is depressed, the job control unit 29 starts the color copy job or B/W copy job according to the depressed key. When the hardware resource needed for the copy job cannot immediately be used, this job is registered to the job queue, and the job control unit 29 starts this job just after the hardware resource can be used.

This is the description in the case where the smartphone 14b communicates with the digital multifunction peripheral 11b through the NFC having very narrow field. In the short-range wireless communication with Wi-Fi or Bluetooth, the field is wider than the NFC. In the NFC, communication can be made within the range from a few centimeters to about 1 meter, even though the user does not make his/her smartphone 14b close to the digital multifunction peripheral 11b to an extent that the smartphone 14b can touch the digital multifunction peripheral 11b. In this case, if the smartphone 14b is within the field of the digital multifunction peripheral 11b, the data of the job setting screen and the data of the job setting can be sent and received between the smartphone 14b and the digital multifunction peripheral 11b.

In general, the short-range wireless communication such as Wi-Fi wireless LAN has a field wider than NFC. However, the short-range wireless communication requires troublesome operation of selecting a wireless network or inputting a password. The NFC has a narrow communication area. However, the NFC provides the feature that the image forming apparatus and the portable information processing device can make one-to-one authentication with each other, since they communicate with each other in a near field, whereby a labor of the user for the authentication can be reduced. The short-range wireless communication using Bluetooth can fall somewhere between the wireless LAN and the NFC. Although a paring operation is needed at the beginning of the communication, the smartphone 14b can be authenticated only by entering the field after the next communication.

When the operation button of the "job status" is depressed on the job setting screen 45a in FIG. 4 or the job setting screen 45b in FIG. 5 while the smartphone 14b falls within the field, this operation is received by the near field communication unit 21. The job control unit 29 changes the job setting screen 41 to the job status screen displaying the execution status of the job in response to this operation. The job status screen is based on the status information. The status information is managed by the control unit 23 including the job control unit 29, and indicates the status of the digital multifunction peripheral 11b.

In the case where the job setting screens 45a and 45b are executed by the installed application or add-on on the Web browser, a message indicating that the application or the add-on cannot communicate with the digital multifunction peripheral may be displayed, after the button of the job status is touched when the smartphone 14b does not fall within the field. Alternatively, a message indicating that the Web browser is not connected to the digital multifunction peripheral 11b that is the Web server may be displayed. When the user returns in the field (when the user touches in the case of the NFC) after reading this message, the data communication is executed.

<Confirmation of Job Status and Operation of Job>

Figure 6:
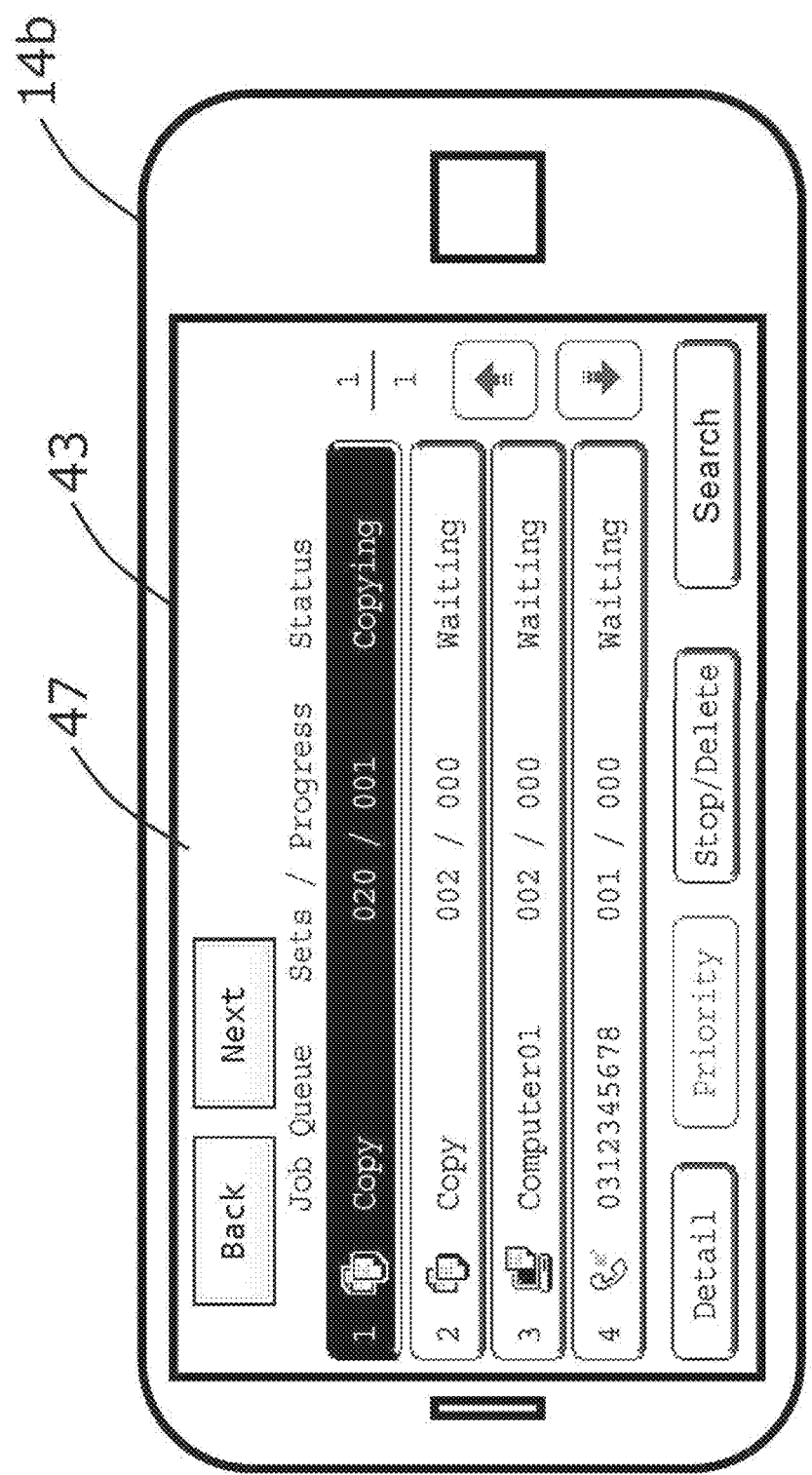
FIG. 6 is an explanatory view illustrating one example of a job status screen displayed on the display unit of the portable information processing device according to the embodiment of the present invention.

FIG. 6 is an explanatory view illustrating one example of the job status screen displayed on the display unit of the portable information processing device according to the present embodiment. As illustrated in FIG. 6, the job control unit displays the job that is in progress or in the job queue on the job status screen 47. The display of "Copying" indicates that the job is currently in progress, and the display of "Waiting" indicates that the job is waiting to be executed. The job control unit 29 also receives the operation relating to the displayed job.

For example, when the "Detail" button is touched on the job status screen 47 in FIG. 6 with either one of the job in progress and the job in the waiting status being touched and selected, this operation is transmitted to the job control unit 29 via the near field communication unit 21. The job control unit 29 transmits the detail of the selected job setting to the smartphone 14b as one of the status information, in response to this operation. The smartphone 14b displays the detail of the job setting on the display unit 43 based on the status information.

Figure 7:
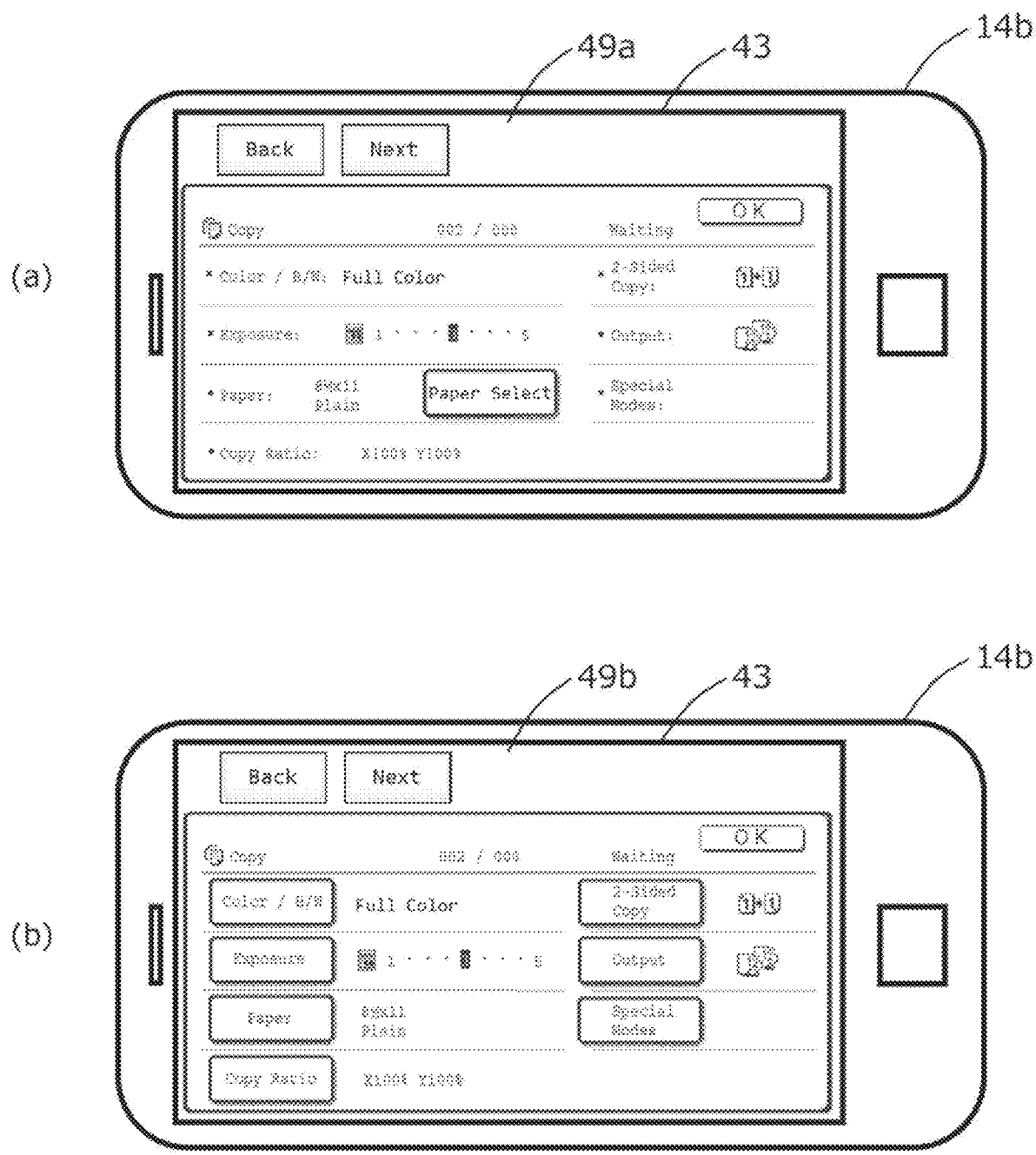
FIG. 7 is an explanatory view illustrating an example of a job setting confirmation screen displayed on the display unit of the portable information processing device according to the embodiment of the present invention.

FIG. 7 is an explanatory view illustrating an example of a job setting confirmation screen displayed on the display unit of the portable information processing device according to the present embodiment.

For the job whose job setting is set on the smartphone 14b and that is waiting to be executed, all or a part of the job setting can be changed. For the job that is currently in progress and the job whose job setting is set on the other portable information processing device or the operation unit 33, only the confirmation of the job setting is possible. However, the job setting cannot be changed by the smartphone 14b. The selection of paper can be changed exceptionally. This is because, when a paper of a size other than the paper loaded on the digital multifunction peripheral 11b is set, the result can be outputted with the paper of any size loaded on the multifunction peripheral 11b. FIG. 7(a) illustrates a job setting confirmation screen 49a by which only the confirmation of the job setting is possible. FIG. 7(b) illustrates a job setting confirmation screen 49b by which the job setting can be changed.

A "Priority" button displayed in grayout is provided at the right side of the "Detail" button, and "Stop/Delete" button is provided at the right side of the "Priority" button on the job status screen 47 in FIG. 6.

The "Priority" button moves the job, which is set on the smartphone 14b, out of the jobs waiting to be executed to the head of the job queue. The reason why this button is displayed in grayout in FIG. 6 is because the selected job is the job in progress. This button is also displayed in grayout when the job whose job setting is made on a device other than the smartphone 14b is selected.

The "Stop/Delete" button stops the execution of the job that is in progress, and deletes the job, which is waiting to be executed, from the job queue. The job that can be stopped or deleted is the job set on the device other than the smartphone 14b.

<Search for Other Apparatus by Use of Cloud Server>

The button of "Search" is used for an operation of searching other image forming apparatuses set up around the digital multifunction peripheral 11. As illustrated in FIG. 1, the digital multifunction peripheral 11b according to the present embodiment is connected to the cloud server 17 via the network. The cloud server can communicate with plural image forming apparatuses, and acquires status information of each image forming apparatus.

When the "Search" button is depressed on the smartphone 14b, this operation is transmitted to the control unit 23 through the near field communication unit 21. The control unit 23 requests to search other image forming apparatus to the cloud server 17 via the far field communication unit 35. The cloud server 17 returns information about the other image forming apparatus, which is present close to the digital multifunction peripheral 11b and which is not busy, to the digital multifunction peripheral 11b based on the status information acquired from each image forming apparatus, in response to this request. When receiving this information, the control unit 23 transfers this information to the smartphone 14b.

As described above, the user can recognize the number of jobs, which are waiting to be executed, on the digital multifunction peripheral 11b from the job status screen of the smartphone 14b. When the waiting time until the execution of the job may be long, the user depresses the "Search" key. Then, the request of searching the other apparatuses is transmitted to the cloud server 17 via the digital multifunction peripheral 11b. The cloud server 17 searches other image forming apparatuses set around the digital multifunction peripheral 11b receiving the request based on the information of the set-up place preliminarily stored. The cloud server 17 searches an image forming apparatus that is set up in the neighborhood, is not broken, has no job that is waiting to be executed, and is supposed to have a shorter processing time for the job waiting to be executed than a reference time even if it has the job to be executed. The cloud server 17 transmits the information about the corresponding image forming apparatus to the image forming apparatus that issues the request together with the information about the set-up place. In this case, the cloud server 17 transmits these information pieces to the digital multifunction peripheral 11b. If the smartphone 14b has a GPS function, the user can acquire a map display or navigation service using the set-up place of the other image forming apparatus acquired from the cloud server 17 via the digital multifunction peripheral 11b.

As described above, the user acquires the information about the other apparatuses from the cloud server 17 according to the search of the other apparatuses, whereby the waiting time of the user can be reduced, and the usability of all of the image forming apparatuses connected to the cloud server 17 can be increased.

<Operation of Job Based on Field Monitoring>

The job control unit 29 may monitor whether the smartphone 14b that makes the job setting stays within the field or not during the period of waiting for the execution of the job. When the smartphone 14b goes beyond the field, the job control unit 29 determines that the user is apart from the field, and may immediately delete the job that is waiting to be executed. Alternatively, the job control unit 29 may continue to monitor in a fixed period of time while suspending the execution of the job, and after the smartphone 14b falls within the field until the end of the period, the job control unit 29 may cancel the suspension of the execution.

When the smartphone 14b goes beyond the field, the selection as to whether the job control unit 29 immediately deletes the job, which is waiting to be executed, or suspends the execution of the job for a fixed period of time and monitors that the smartphone 14b returns in the field, and the length of the period may be executed by using the application or add-on on the smartphone 14b.

In the case where the job control unit 29 waits for the instruction of the start of the job after receiving the job setting, the job control unit 29 may monitor whether the smartphone 14b that makes the job setting stays within the field or not. When the smartphone 14b goes beyond the field, the job control unit 29 determines that the user is apart from the field, and may immediately delete the job that is waiting for the instruction to start. Alternatively, the job control unit 29 may continue to monitor in a fixed period of time while holding the job setting, and when the job control unit 29 does not receive the instruction to start until the end of the period, the job control unit 29 may delete this job setting.

When the smartphone 14b goes beyond the field, the selection as to whether the job control unit 29 immediately deletes the job, which is waiting for the instruction to start, or holds this job for a fixed period of time to wait for the instruction to start, and the length of the period may be executed by using the application or add-on on the smartphone 14b.

<<Process Flow>>

The process of the control unit 23 including the job control unit 29 will be described. FIGS. 8 to 11 are flowcharts illustrating the procedure of the process executed by the control unit 23 according to the present embodiment. The flowchart focuses on the characteristic aspect of the present embodiment, and the flowchart does not illustrate other processes and the detail for changing the screen on the display unit 43.

Figure 8:
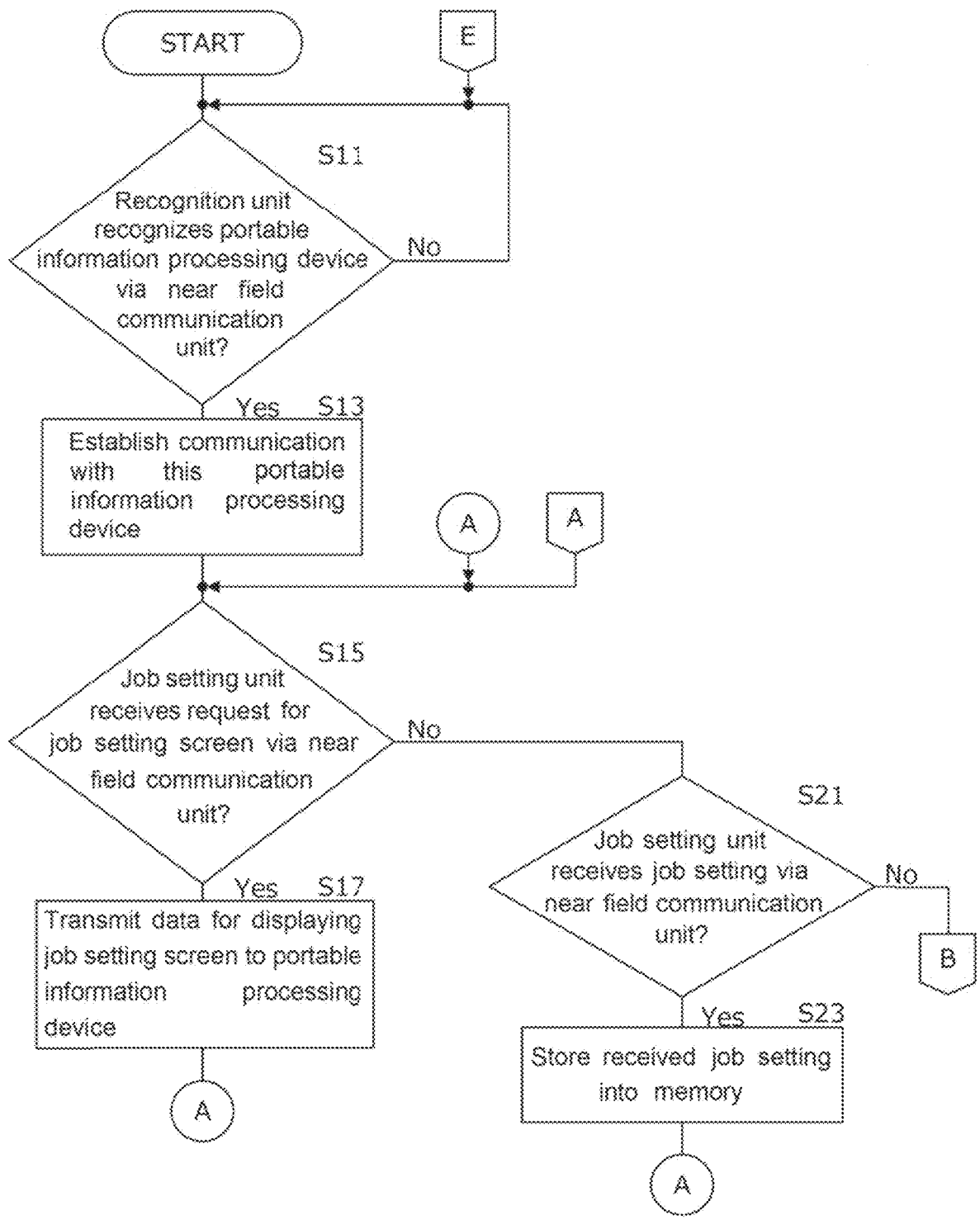
FIG. 8 is a flowchart illustrating a procedure of a process executed by a control unit according to the embodiment of the present invention.

In FIG. 8, the control unit 23 firstly checks whether or not the recognition unit newly recognizes a portable information processing device by communication through the near field communication unit 21 (step S11). If there is no newly-recognized portable information processing device (No in step S11), the routine is looped. However, since the process is executed under a multi-task environment, the other tasks are actually simultaneously executed while the routine is looped.

If there is the newly-recognized portable information processing device (Yes in step S11), the control unit 23 establishes communication with this portable information processing device (step S13).

Next, the control unit 23 serving as the job setting unit 27 checks whether or not the control unit 23 receives the request for the job setting screen via the near field communication unit 21 (step S15). The control unit 23 receives the request for the job setting screen when the portable information processing device that makes communication with the NFC is touched. Alternatively, the control unit 23 receives the request when the portable information processing device communicating with the Wi-Fi or Bluetooth falls within the field and the application or the Web page or add-on for the job setting is started by the user's operation. The control unit 23 also receives the request when the job setting screen is changed to another screen by the user's operation of the job setting screen.

When the control unit 23 receives the request for the job setting screen (Yes in step S15), the job setting unit 27 transmits data for displaying the job setting screen to the portable information processing device issuing the request.

Specifically, the job setting unit 27 transmits the application in response to the request or the data for displaying the Web page.

Then, the routine returns to step S15.

When the control unit does not receive the request for the job setting screen (No in step S15), the control unit 23 serving as the job setting unit 27 checks whether the job setting unit 27 receives the job setting or not via the near field communication unit 21 (step S21). The job setting is received when a "Send" button is operated on the job setting screen of the portable information processing device.

When receiving the job setting (Yes in step S21), the job control unit 29 stores the received job setting into the memory for each of the portable information processing devices that transmit the job setting (step S23).

Then, the routine returns to step S15.

Figure 9:
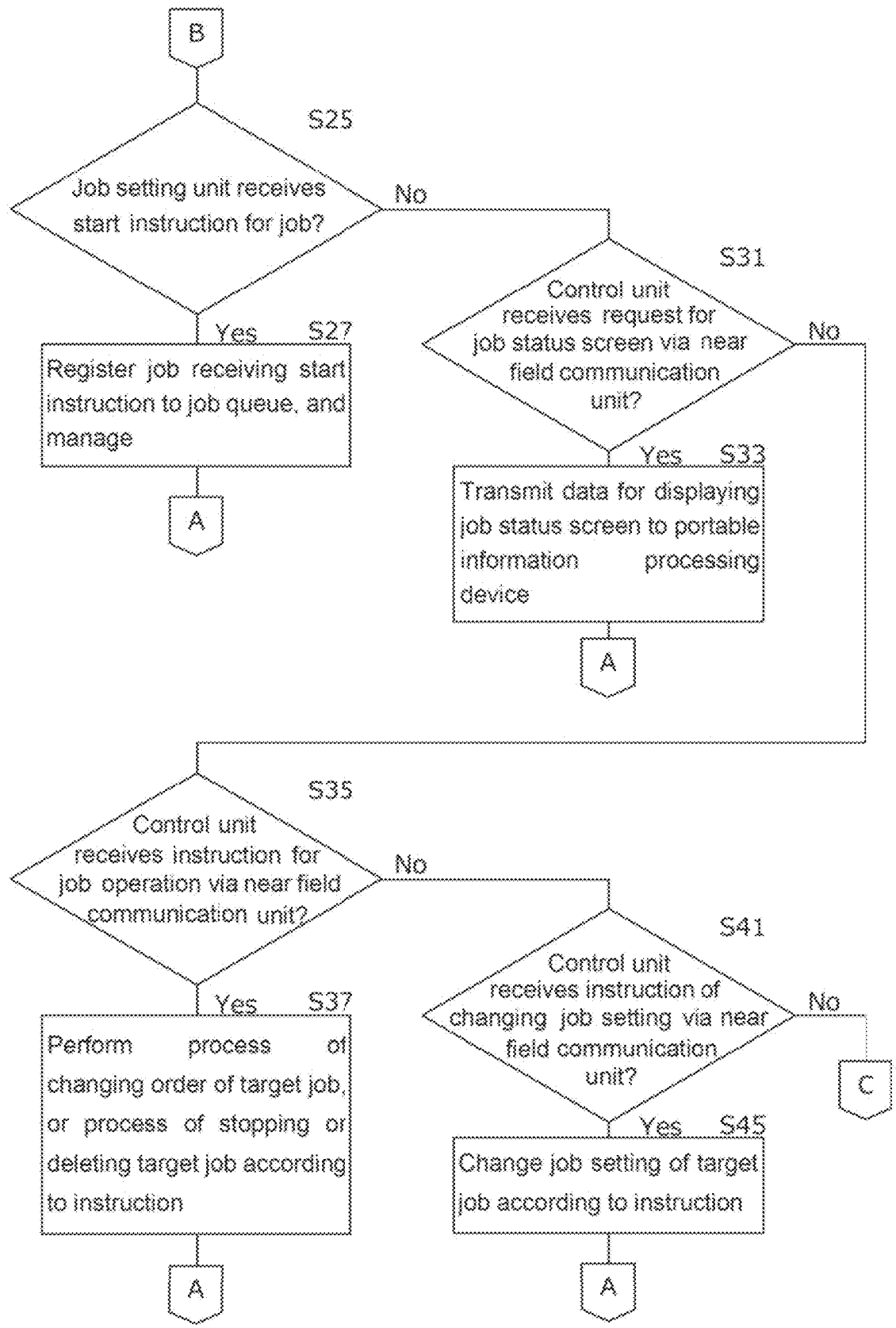
FIG. 9 is a flowchart illustrating a continuation of the process in FIG. 8.

When the job setting is not received in step S21 (No in step S21), the control unit 23 then checks whether or not the control unit 23 receives the instruction to start the job as the job setting unit 27 (step S25 in FIG. 9). In the case of a walk-up job such as a copy job, the instruction to start the job corresponds to the depressing operation of the color start key or the B/W start key, which are not illustrated, on the operation unit 33. In the case of a print job, the instruction to start the job corresponds to the reception of print data or job setting data.

When receiving the instruction to start the job (Yes in step S25), the job control unit 29 registers the job whose start instruction is received to the job queue (step S27). Thereafter, the routine returns to step S15. The job control unit 29 manages the job registered to the job queue until the end of the execution of the job.

When the control unit 23 does not receive the instruction to start the job in step S25 (No in step S25), the control unit 23 checks whether or not it receives a request for the job status screen through the near field communication unit 21 (step S31). The control unit 23 receives the request for the job status screen when the job status button is touched. Alternatively, the control unit 23 receives the request when the screen is changed to another screen by the depressing operation of the detail button or other buttons on the job status screen 47.

When receiving the request for the job status screen (Yes in step S31), the job setting unit 27 transmits data for displaying the jot status screen to the portable information processing device that issues the request. Specifically, the job setting unit 27 transmits the response to the request to the application or transmits the data for displaying the Web page.

Then, the routine returns to step S15.

When the control unit 23 does not receive the request for the job status screen in step S31 (No in step S31), the control unit 23 then checks whether or not it receives the instruction for the job operation through the near field communication unit 21 (step S35). The control unit 23 receives the instruction for the job operation when the Priority button or Stop/Delete button on the job status screen 47 is operated, for example.

When receiving the request for the job status screen (Yes in step S35), the job setting unit 27 executes a process of changing the order of the target job or a process of stopping/deleting the job (step S37).

Then, the routine returns to step S15.

When the control unit 23 does not receive the instruction for the job operation in step S35 (No in step S35), the control unit 35 checks whether or not it receives an instruction to change the job setting through the near field communication unit 21 (step S41). The control unit 23 receives the instruction to change the job setting when the button for changing the job setting, such as the color/B/W button, 2-sided button, or exposure button, on the job setting confirmation screen 49b is operated, for example.

When receiving the instruction to change the job setting (Yes in step S35), the job setting unit 27 executes a process of changing the job setting of the target job according to the instruction (step S45).

Then, the routine returns to step S15.

Figure 10:
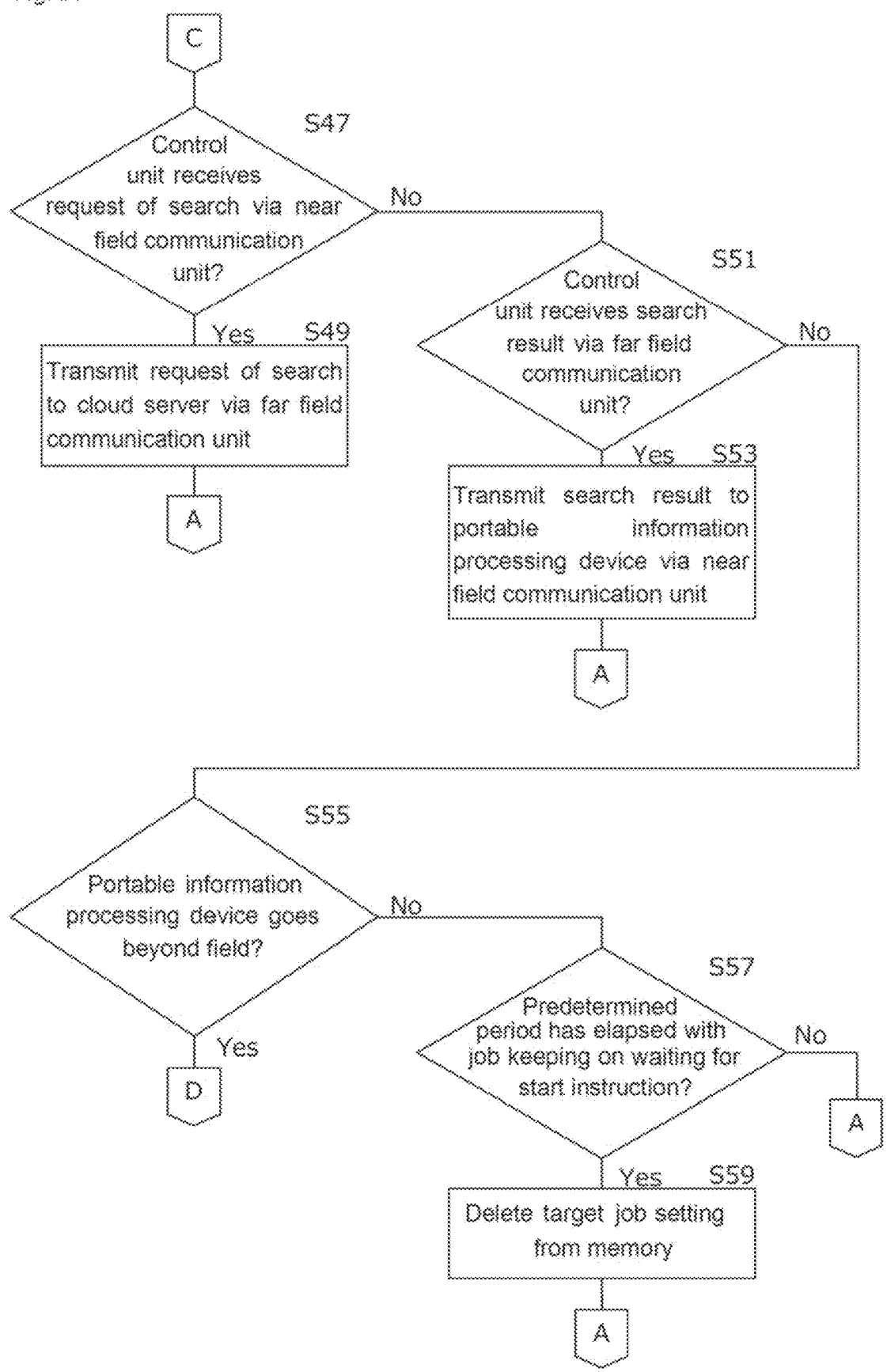
FIG. 10 is a flowchart illustrating a continuation of the process in FIG. 9.
Figure 11:
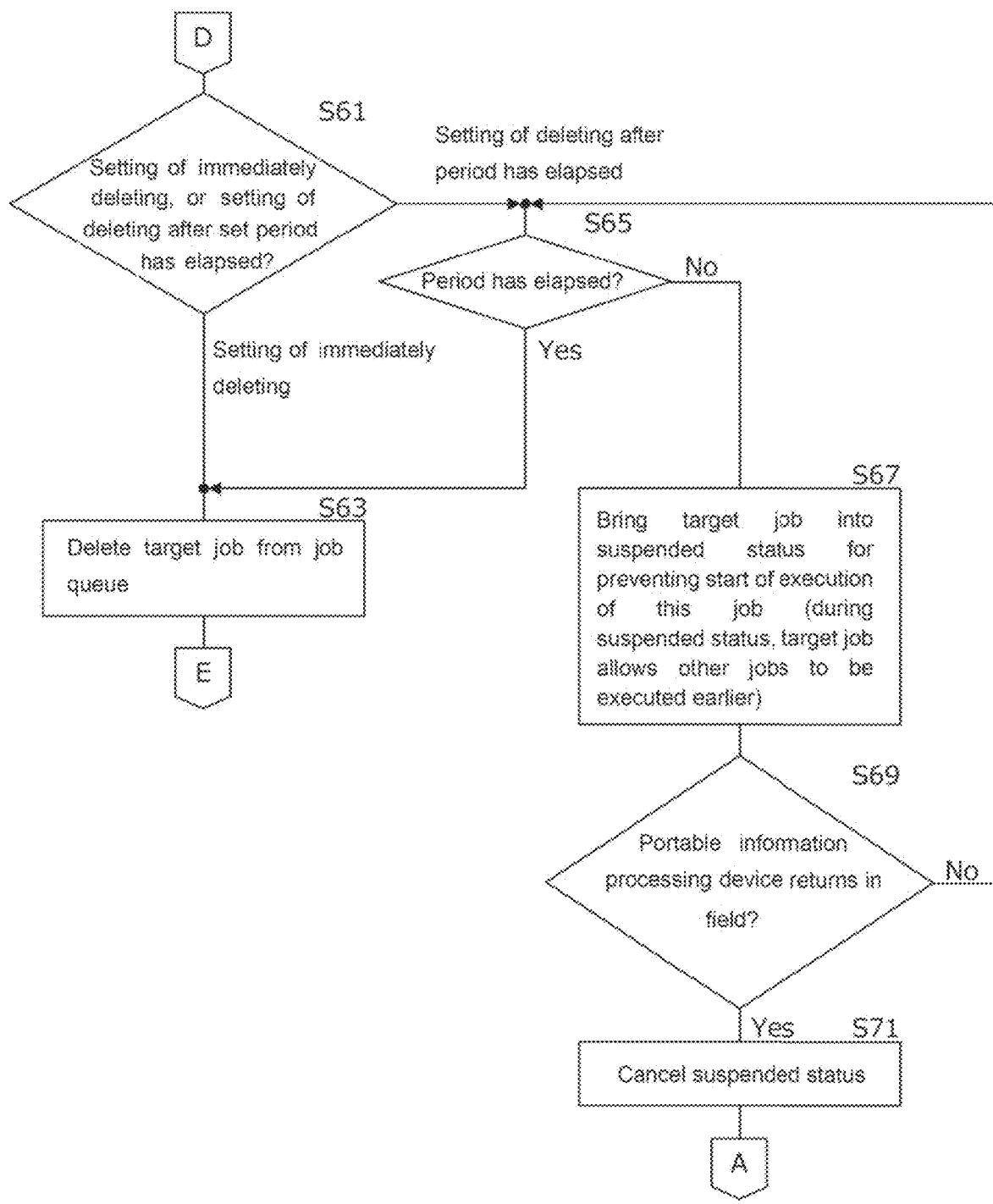
FIG. 11 is a flowchart illustrating a continuation of the process in FIG. 10.

When the control unit 23 does not receive the instruction to change the job setting (No in step S41), the control unit 23 then checks whether or not it receives a request for searching other apparatuses through the near field communication unit 21 (step S47 in FIG. 10). The control unit 23 receives the request for searching other apparatuses when the "Search" button is operated on the job status screen 47 in FIG. 6, for example.

When receiving the request for searching the other apparatuses (Yes in step S47), the control unit 23 executes a process of transmitting the request for searching other apparatuses to the cloud server 17 through the far field communication unit 35 (step S49).

Then, the routine returns to step S15.

When the control unit 23 does not receive the request for searching other apparatuses (No in step S47), the control unit 23 checks whether or not it receives the result of the search for the other apparatuses through the far field communication unit 35 (step S51). The result of the search for the other apparatuses is transmitted from the cloud server 17 according to the request for searching the other apparatuses in step S49.

When receiving the result of the search for the other apparatuses (Yes in step S51), the control unit 23 transmits the result of the search for the other apparatuses to the portable information processing device through the near field communication unit 21 (step S53).

Then, the routine returns to step S15. The display 43 of the portable information processing device displays the result of the search for the other apparatuses (not illustrated).

When the control unit 23 does not receive the result of the search for the other apparatuses in step S51 (No in step S51), the control unit 23 checks whether or not the portable information processing device serving as the recognition unit 25 goes beyond the field (step S55). The process when it is determined that the portable information processing device goes beyond the field (Yes in step S55) will be described later as the process in FIG. 11.

When determining that the portable information processing device does not go beyond the field (No in step S55), the control unit 23 checks whether the predetermined time has elapsed or not, while waiting for the instruction to start the job (step S57).

When the period has elapsed (Yes in step S57), the control unit 23 executes a process of deleting the target job setting from the memory as the job control unit 29 (step S59).

Then, the routine returns to step S15.

When the control unit 23 determines that the portable information processing device goes beyond the field (Yes in step S55), the job control unit 29 checks which setting is made in this case. Specifically, the job control unit 29 checks whether the setting of immediately deleting the job registered by the portable information processing device that goes beyond the field is made, or the setting of deleting the job after the predetermined period has elapsed is made (step S61).

When the setting of immediately deleting the job is made, the job control unit 29 deletes the target job from the job queue (step S63).

Then, the routine returns to step S11.

On the other hand, when the setting of deleting the job after the predetermined period has elapsed is made in step S61, the routine proceeds to step S65 to check whether the predetermined period has elapsed or not. After the period has elapsed (Yes in step S65), the routine proceeds to step S63 described above where the job control unit 29 deletes the target job from the job queue.

If the period has not elapsed (No in step S65), the job control unit 29 brings the job into a suspended state in order not to start the execution of the job. Specifically, this job keeps in the state of waiting to be executed, and allows the other job to be started earlier than this job (step S67).

Thereafter, the control unit 23 serving as the recognition unit 25 checks whether or not the portable information processing device that is outside the field returns into the field before the period has elapsed (step S69). If the portable information processing device does not return into the field (No in step S69), the routine proceeds to step S65 described above. The routine is looped until the predetermined period has elapsed or the portable information processing device returns into the field.

In the case where the portable information processing device, which is temporarily outside the field, returns into the field before the predetermined period has elapsed (Yes in step S69), the job control unit 29 cancels the suspended status of the corresponding job (step S71).

Then, the routine returns to step S15. After the suspended status of the job is canceled, the execution of this job is started when this job's turn comes, similar to the other jobs registered to the job queue.

This is the flow of the characteristic process of the present embodiment, out of the processes executed by the control unit 23.

The characteristics of the present embodiment described above will be described in some different aspects.

The image forming apparatus according to the present invention includes a near field communication unit configured to make a short-range wireless communication with a portable information processing device including a display unit and a control unit, the control unit including: a recognition unit configured to recognize a portable information processing device that is within a communicable range through communication via the near field communication unit; a job setting unit configured to transmit data for displaying and activating a job setting screen on the display unit of the recognized portable information processing device, via the near field communication unit, the job setting screen being displayed for selecting and setting a job among a plurality of jobs which are capable of being processed; and a job control unit configured to execute the selected job in response to a start instruction thereof the job, wherein the job setting unit receives a job setting, which is made by using the job setting screen, via the near field communication unit after the recognition to receive the job setting from the portable information processing device, and the job control unit receives a start instruction for the job whose job setting is received.

First Embodiment

In the embodiment of this invention, the portable information processing device is carried by a user, and performs an authentication process and operating process. Examples of the specific forms of the portable information processing device include a smartphone, a tablet computer, and a mobile computer. However, the portable information processing device is not limited thereto.

The near field communication unit indicates an interface circuit that performs communication with a wireless communication system having communicable distance shorter than that of mobile communication such as CDMA or LTE of a cellular phone. Specific examples of the near field communication unit include the one complying with a communication standard such as Wi-Fi, Bluetooth, or NFC. However, the near field communication unit is not limited thereto.

The authentication information may be stored beforehand in the portable information processing device, or the user may operate the portable information processing device to input the authentication information. Alternatively, the portable information processing device may catch a characteristic (e.g., biological characteristic) specific to the user.

The job is a series of processes of processing and outputting input data by the image forming apparatus. Examples of the job include a copy job, a print job, a scan job, a fax transmission job, and a fax receiving job.

The job setting screen is an operation screen by which a setting required for executing the job is made. For example, a copy number in the copy job, a selection as to whether the copy job is 2-sided copy or 1-sided copy, a selection of a post-process, and other settings are made on the job setting screen.

The registration of the completion of the job setting means that the job setting is brought under the control of the job control unit, and the job is in the status of waiting for a start instruction. After the job, which is waiting for a start instruction, receives the start instruction, this job is changed to the status of waiting to be executed or to the status in progress. The status of waiting to be executed means the status in which the job is waiting to be executed due to the reason that the other job is in progress, and after the reason for waiting is eliminated, the execution of this job is started.

Each of the authentication unit, the job setting unit, and the job control unit is realized such that a computer reads a program (software) stored beforehand in a memory and corresponding to each function, and performs a process in cooperation with a hardware resource of the image processing apparatus.

Preferable aspects of the present invention will also be described.

The job setting screen may be displayed and activated by an application being installed beforehand into the portable information processing device.

In addition, the data transmission from the job setting unit may request to start the application.

Alternatively, the job setting screen may be displayed and activated by a Web browser being installed beforehand into the portable information processing device.

In addition, the data transmission from the job setting unit may request to start the Web browser.

The image forming apparatus according to the present invention may further comprise an operation unit for displaying a job setting screen on the image forming apparatus side, wherein the job setting screen displayed on the image forming apparatus side may provide corresponding set items to the job setting screen displayed on the portable information processing device side through the design of the job setting screens different from each other.

The image forming apparatus according to the present invention may further comprise a far field communication unit for communicating through a network with an external cloud server which stores set-up places and statuses of image forming apparatuses being connected through the network, wherein the portable information processing device may accept a request of searching another image forming apparatus via the job setting screen from a user and transmits the request to the near field communication unit, and the control unit may transmit the received request to the cloud server through the far field communication unit, may receive information about another image forming apparatus which is set up in the neighborhood and supposed to have a shorter processing time than the image forming apparatus for the job waiting to be executed in response to the request, and may transmit the received information to the portable information processing device for displaying the information on the display unit.

Moreover, a map display or navigation service based on the information may be provided on the display unit.

Second Embodiment

The near field communication unit may be capable of communicating with plural portable information processing devices that fall within a communicable near field, and the job control unit may transmit status information, indicating whether the registered job is waiting for a start instruction, is waiting to be executed, or is currently in progress, to each of the portable information processing devices, and may receive an instruction of deleting or editing the job that is waiting for a start instruction or the job that is waiting to be executed, from each of the portable information processing devices.

According to this configuration, the user can delete or edit the job, as well as confirm the status of the job, by using the portable information processing device.

Third Embodiment

The job control unit may receive an instruction of changing the order of the jobs that are waiting to be executed from each of the portable information processing devices.

According to this configuration, the user can change the execution order of the job, as well as confirm the status of the job, by using the portable information processing device.

Fourth Embodiment

When the portable information processing device that registers the job waiting for a start instruction or the job waiting to be executed is outside the communicable near field before the execution of the job, the job control unit may delete this job, or brings this job into a suspended status until a predetermined period has elapsed, and when the portable information processing device returns in the communicable near field before the predetermined period has elapsed, the job control unit may restart the job, while the job control unit may delete the job unless the portable information processing device returns in the communicable near field before the predetermined period has elapsed.

This configuration can prevent the undesirable situation in which the user who registers the job that is in the status of waiting to be executed leaves for some reason, and this registered job is left.

Fifth Embodiment

The image forming apparatus may further include: a far field communication unit configured to communicate with an external server, wherein the status information may include information as to whether the image forming apparatus is in a normal operating status or not, the job control unit may transmit the status information and information about a set-up place to the server via the far field communication unit, the server may store the status information and the set-up place information together with status information and set-up place information transmitted from other image forming apparatus, and when the image forming apparatus is not in the normal operating status or is in the status in which the number of the jobs waiting to be executed exceeds a predetermined reference number, the job control unit may control to transmit this condition to each of the portable information processing devices that are within the communicable near field, and may search the information stored in the server to provide a set-up place of other image forming apparatus that is in the normal operating status and in the status in which the number of the jobs waiting to be executed is not more than the predetermined reference number, to each of the portable information processing devices.

According to this configuration, when the image forming apparatus does not normally operate or when it takes much time until an execution of a job, the user can acquire information of the other usable image forming apparatus by using the portable information processing device.

The preferable aspects of the present invention include the one formed by combining some of the above-mentioned plural aspects.

Besides the above-mentioned embodiments, various modifications for the present invention are possible. These modifications should not be construed as not belonging to the scope of the present invention. The accompanying claims and their equivalents are intended to cover such forms or modifications as would fall within the scope of the invention.

The invention claimed is:

1. An image forming apparatus comprising:
   a wireless communication circuitry configured to make a wireless communication with a portable information processing device including:
   a display unit for displaying a simplified job setting screen on the portable information processing device side; and
   an operation unit for displaying a full job setting screen on the image forming apparatus side; and
   a computer and a memory storing a program causing the computer to execute:
   a recognition step recognizing a portable information processing device that is within a communicable range through communication via the wireless communication circuitry;
   a job setting step receiving a job setting; and
   a job control step receiving a start instruction and executing the job in response to the start instruction, wherein the job setting step receives the job setting, which is made by use of the simplified job setting screen, from the portable information processing device, via the wireless communication circuitry after the portable information processing device falls within the communicable range or receives the job setting, which is made by use of the full job setting screen, from the operation unit; and
   the full job setting screen provides not only corresponding set items but also additional information on the item to the simplified job setting screen.

2. The image forming apparatus according to claim 1, wherein at least a top menu of the set items with the additional information are displayed as icons.

3. The image forming apparatus according to claim 2, wherein the additional information include a list of specific and executable jobs as illustrations.

4. The image forming apparatus according to claim 2, wherein at least arrangement of the top menu of the set items on the full job setting screen corresponds to arrangement on the simplified job setting screen.

* * * * *